(12) United States Patent
Mestha et al.

(10) Patent No.: US 7,633,647 B2
(45) Date of Patent: *Dec. 15, 2009

(54) METHOD FOR SPATIAL COLOR CALIBRATION USING HYBRID SENSING SYSTEMS

(75) Inventors: Lalit Keshav Mestha, Fairport, NY (US); R. Enrique Viturro, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/501,654

(22) Filed: Aug. 9, 2006

(65) Prior Publication Data

US 2008/0037069 A1 Feb. 14, 2008

(51) Int. Cl.
*G06F 15/00* (2006.01)
(52) U.S. Cl. .................................................. 358/1.9
(58) Field of Classification Search ................... 358/1.9
See application file for complete search history.

(56) References Cited

U.S. PATENT DOCUMENTS

| 6,384,918 | B1 | 5/2002 | Hubble, III et al. |
| 6,636,628 | B1 | 10/2003 | Wang et al. |
| 2004/0257595 | A1 | 12/2004 | Sharma et al. |

OTHER PUBLICATIONS

J.Z. Chang, "Sequential Linear Interpolation of Multidimensional Functions", IEEE Trans. on Image Processing, vol. 6, pp. 1231-1245, Sep. 1997.
S.A. Dianat and L.K. Mestha, "Dynamic Optimization Algorithm for Generating Inverse Printer Maps with Reduced Measurements", IEEE Conference on Decision & Control 2004, Dec. 12-15, 2005, Seville, Spain.
U.S. Appl. No. 11/170,928, filed Jun. 30, 2005, Viturro, et al.
U.S. Appl. No. 11/314,670, filed Dec. 12, 2005, Z. Fan, et al.

*Primary Examiner*—Twyler L Haskins
*Assistant Examiner*—Michael Burleson
(74) *Attorney, Agent, or Firm*—Fay Sharpe LLP

(57) ABSTRACT

A method and system for color calibration or color output device spectrophotoically measures at test target including a preselected test color value. A multi-dimensional LUT of the device is generated representative of the color information including the at least one preselected color. Producing a second image width device including the at least one preselected color located at a plurality of spatial locations in the second image. A second sensor measures the second image and a plurality of spatial locations having the preselected color for generating reflectance information for the preselected color at the plurality of spatial locations. An error is determined between the measured color of the one preselected color and the reflectance information at the other pixel locations. A multi-dimensional LUT is adjusted to minimize spatial uniformity errors at the other pixel locations, thus calibrating device color output spatially.

20 Claims, 3 Drawing Sheets

METHOD FOR SPATIAL COLOR CALIBRATION USING HYBRID SENSING SYSTEMS

BACKGROUND

A method and system for printer color calibration are disclosed, and more particularly, a combination of a full-width array (FWA) or similar page-scanning mechanism in conjunction with an spectrophotometer color measurement system in the output path of a color printing system for measuring colors wherein spatial color maps are used to adjust multi-dimensional color look-up tables to obtain good color correction of macro uniformity defects.

In many business applications, color documents have become essential as a component of communication. Color facilitates the sharing of knowledge and ideas. Companies involved in the development of color output devices continue to look for ways to improve the total image quality of such devices. One of the elements that affects the perception of image quality is an ability to consistently produce the same quality image output on a printer from one day to another, from one week to the next, month after month. Users are accustomed to printers and copiers that produce high quality color and gray scale output. Users further expect to be able to reproduce a color image with consistent quality on any compatible output device, including another device within an organization, a device at home or a device used anywhere else in the world. Hence, there remains a commercial need for efficiently maintaining print color predictability, particularly as electronic marketing has placed more importance on the accurate representation of merchandise in illustrative print or display media.

Color rendering devices (e.g., a printer, copier, or other image output device) often have problems with macro uniformity defects, like streaks, banding, "smile/frown" defects, etc. Recently filed patent application, U.S. application Ser. No. 11/170,928, filed Jun. 30, 2005, entitled "SYSTEM AND METHOD FOR SPATIAL GRAY BALANCE CALIBRATION USING HYBRID SENSING SYSTEMS," by R. Enrique Viturro, et al. (which application is hereby incorporated by reference for its entire teachings) shows how to develop a spatial map of gray balanced TRC's (Tone Reproduction Curves) built by in-line spectral photometers. Hybrid sensing is employed to obtain mapping of the spatial gray balance TRCs to correct for the macro uniformity defects. In the development disclosed therein, implementation of spatial maps is accomplished with a sensing system composed of a spectral photometer (LCLED) producing a point wise gray balance TRC, and a full-width array RGB scanner giving information required for obtaining delta (errors) maps required to proliferate the gray balance TRC to every pixel. However, there is no suggestion in the application of extending such a spatial gray balanced calibration to a system of spatial color control methodology. Gray balance provides one-dimensional correction (e.g., corrections to neutral or gray axis) with other color axes not fully corrected. Accordingly, there is a need for calibrating printers with a spatial color control methodology for mapping LUTs to a spatial domain based on the developability state of colors on an output printed sheet.

More particularly, there is a need for a sensing system comprising a spectrophotometer (e.g., low cost light emitting diode (LCLED) spectrophotometer) and the use of uniformity measurements for a full-width array (FWA) scanner bar to measure developability nonuniformity on a photoreceptor or transfer belt. Such devices in combination are suitable to provide a printer or similar output device with macro defect detection and correction capabilities. Control algorithms achieving a spatial mapping for adjusting multi-dimensional LUTs effectively calibrate an output device spatially whereby the device can produce a more uniform color for a calibrated output image.

BRIEF SUMMARY

The embodiments disclosed herein comprise methods and systems for color calibration of a color output device. A first output image is produced with the device in response to an input signal from a test image wherein the first test image includes at least one preselected color. A first sensor measures the image for the preselected color and produces a first output signal indicating color information for the preselected color. A multi-dimensional LUT is produced for the device representative of the color information using measurements from the preselected color.

A second output image is produced with the device which includes the at least one preselected color at a plurality of spatial locations. A second sensor measures the image at the plurality of spatial locations corresponding to the preselected color to produce second output indicating reflectance information at the plurality of spatial locations. Errors are determined between the measured color of the one preselected color at the preselected location and the reflectance information at the other pixel locations. A multi-dimensional LUT is adjusted to minimize the spatial uniformity errors at the other pixel locations, thus calibrating device color output spatially whereby the device produces a more uniform color over a calibrated output image.

The preselected and other pixel locations may comprise an average of a block of pixels in a preselected spatial region of the preselected color. The measuring with the first and second sensors occurs during a real time operation of the device. The color calibration adjusting may comprise three-dimensional LUTs, one for each channel of a CMY measured patch comprising the one preselected color, or in another embodiment, adjusting the three-dimensional LUT including an inverse code output device mapping for every color in the node preceding a forward output device mapping.

In another disclosed embodiment, a xerographic color output device comprises a controller for determining an error between the one preselected color and the measured color at another spatial location for adjusting the LUT of the device to minimize spatial uniformity errors, thereby calibrating the device color output spatially.

BRIEF DESCRIPTION OF THE DRAWINGS

FIG. 2 also depicts a block diagram representation of other notable system elements providing an embodiment for operation of the disclosed method. A first color sensing device 12 is a spectrophotometer that provides spectral information comprising a representative signal of the printed colors of the image and preferably comprises L*, a*, b* values, XYZ, etc. values depending on the desired color description. One such spectrophotometer may be that disclosed in U.S. Pat. No. 6,384,918 by Hubble, III et al. for a SPECTROPHOTOM- ETER FOR COLOR PRINTER COLOR CONTROL WITH DISPLACEMENT INSENSITIVE OPTICS, the disclosure of which is hereby incorporated by reference. The spectrophotometer is for non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting that reflected illumination (multiple illumination sources comprise approximately eight or more individual LEDs) from the test patch. The exemplary spectrophotometer provides non-contact color measurements of moving color target areas variably displaced therefrom within normal paper-path baffle spacings.

DETAILED DESCRIPTION

Figure 1:
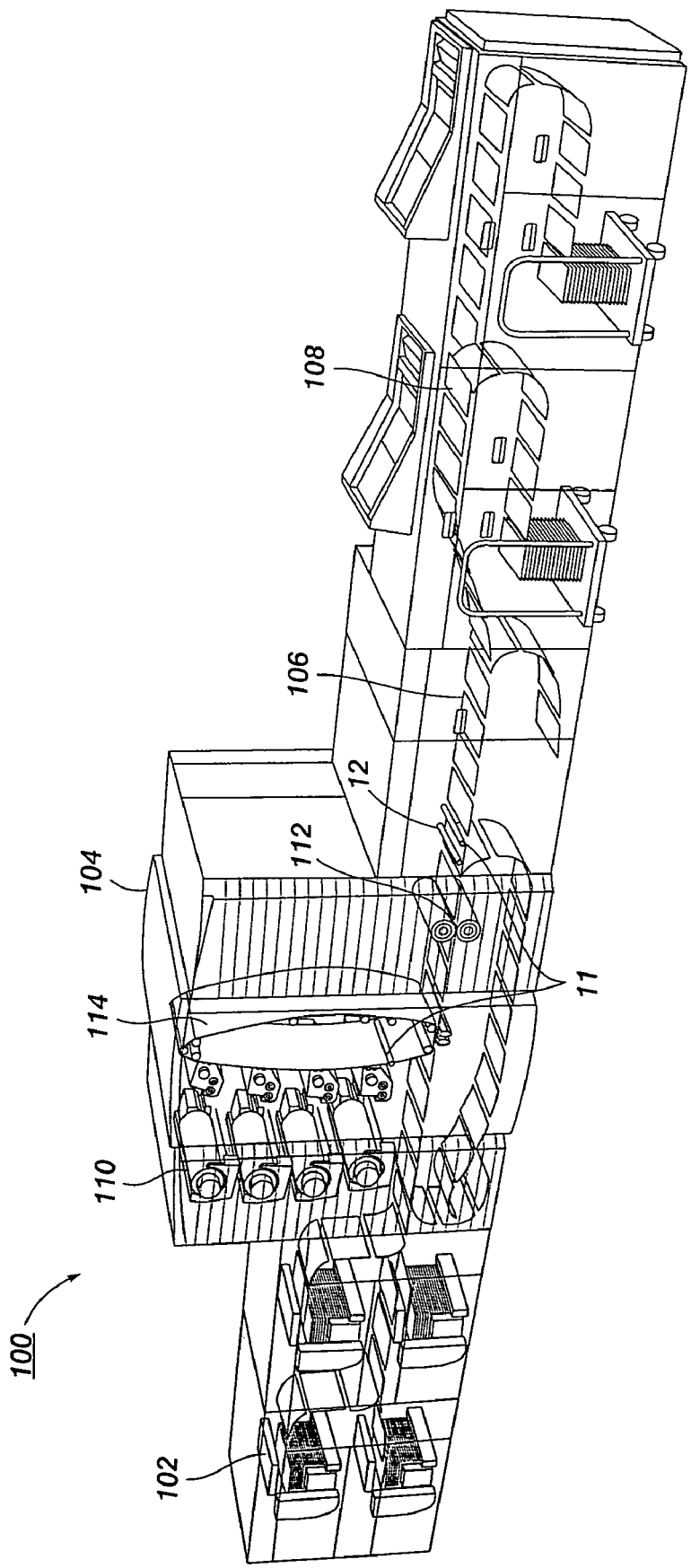
FIG. 1 is an exemplary embodiment of the disclosed system and method which includes an in-line full-width array scanner and spectrophotometer.

The system and method will be described in connection with preferred embodiments, however, it will be understood that there is no intent to limit the scope to the embodiments described. On the contrary, the intent is to cover all alternatives, modifications, and equivalents as may be included within the spirit and scope of the appended claims. Referring now to the drawings, the Figures show a method and apparatus for automatically calibrating a printing or similar output device.

The method and system use a combination of a full-width array (FWA) or similar page-scanning mechanism in conjunction with an on-line spectrophotometer color measurement system in the output path of a color printer for measuring colors (e.g., on printed test sheets, banner/separation pages, etc.) without requiring any manual operations or operator involvement The automatic color balance control system produces multi-dimensional LUT (Look-Up Table) values for the CMY primary colors by printing patches, measuring colors and automatically re-adjusting the LUTs until a satisfactory level of accuracy is obtained. While producing spatially adjusted LUTs, the system will automatically lock the printer output to some predetermined color patch targets. The process is enabled either by the system controller or by a user with minimal interaction.

A physical implementation of this controller is depicted in FIG. 1, which shows the Xerox iGen3™ 110 Digital Production Press, a printer or similar output device 100 providing a xerographic printing system suitable for practicing the method disclosed herein. Printer 100 includes a source of paper or printable substrates 102 that is operatively connected to a printing engine 104, and output path 106 and finisher 108. As illustrated, the print engine 104 is a multi-color engine having a plurality of imaging/development subsystems 110, that are suitable for producing individual color images (e.g., CMYK) on belt 114, where the belt then transfers the images to the substrate.

Figure 2:
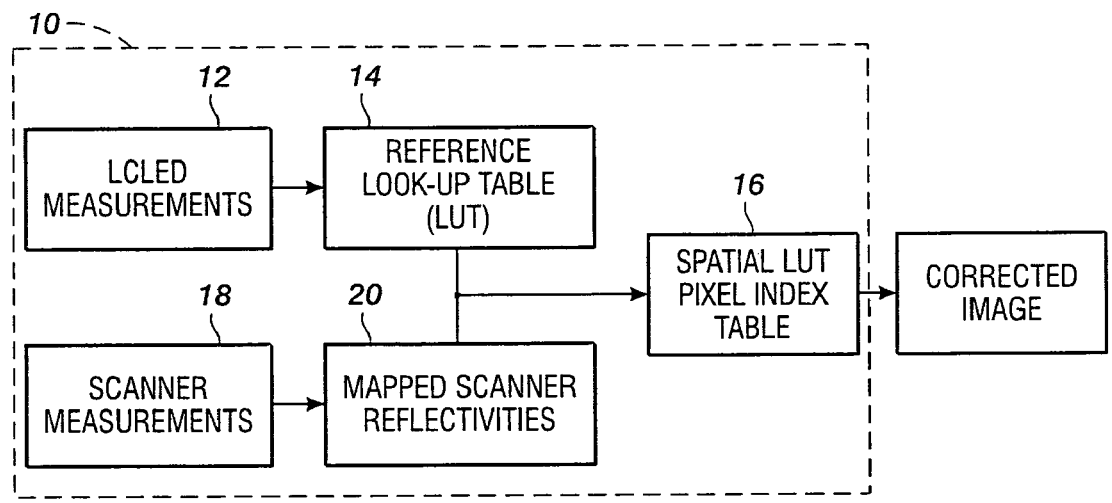
FIG. 2 comprises a functional flowchart/block diagram of the spectrophotometer and scanner based hybrid calibration system and subsequent functions executed by a color controller.

With reference to FIG. 2, the digital front end (DFE) 10 controls the rendering of images in the printer 100 and comprises a conventional image color separation path for processing an input image, as specified in device independent parameters, into CMYK printing parameters acceptable for rendering by the printer. A three-dimensional (3-D) look-up table (LUT) transforms the original image in device independent space (e.g., LAB) to CMY space. The CMY space is transformed to CMYK space by undercolor removal/gray component replacement. Adjustment of the LUT by the spatial LUT index pixel table 16 comprises a calibration and characterization process that is the subject of the present embodiments. The particular signal resulting from the index table 16 is converted into a halftone imaging before actual printing by the marking device 10. A full-width array (FWA) scanner bar measures color values either in the belt 114 (P/R or IBT) or on paper. The measured color reflectivities are then spatially mapped 20 for corresponding associating with the desired color value signals for identifying differences (delta error value) therebetween as will be explained more in detail below.

In many cases, raster image processing (RIPping) of the images is carried out off-line and at the time of printing and the color adjustment be achieved by merely adjusting the LUTs of the pre-RIPped images. The embodied systems and methods achieve a particular output image color, and therefore more accurate output printing, by producing color-adjusted, spatial LUTs at convenient and desirable times (typically during preset intervals like the beginning of a job or throughout long jobs as periodically needed to maintain accuracy) to ensure that the requested colors can be produced. These LUTs are generated by printing mixed color patches of specified target patches of primary colors—CMYK. The RIPped image can then be processed with color adjusted LUTs easily inside the DFE) 10 for facilitating the use of reprinting RIPped jobs without going through a costly and time consuming re-RIPping process.

After the spatial color information is measured by the in-line spectrophotometer 12, and the spatial 2-D reflectance or L*, a*, b* information is measured by the scanner bar 18 on the belt or paper, two-dimensional or three-dimensional calibration techniques can be employed for spatially adjusting the LUT pixel index table.

A two-dimensional calibration technique involves calibration of CMY channels using three two-dimensional LUTs, one for each channel. The inputs to these LUTs are functions of the input CMY values. For instance, the inputs to the LUT, which determines the transformation for the Cyan channel, are C and M+Y. Similarly for the Magenta channel, the inputs are M and C+Y and for Yellow channel, the inputs are Y and C+M. The corrected CMY values are given by equations (1), (2) and (3).

$$C'=f_1(C,M+Y) \quad (1)$$

$$M'=f_2(M,C+Y) \quad (2)$$

$$Y'=f_3(Y,C+M) \quad (3)$$

The functions $f_1$, $f_2$ and $f_3$ are implemented in full resolution two-dimensional LUTs that require no interpolation.

Figure 3:
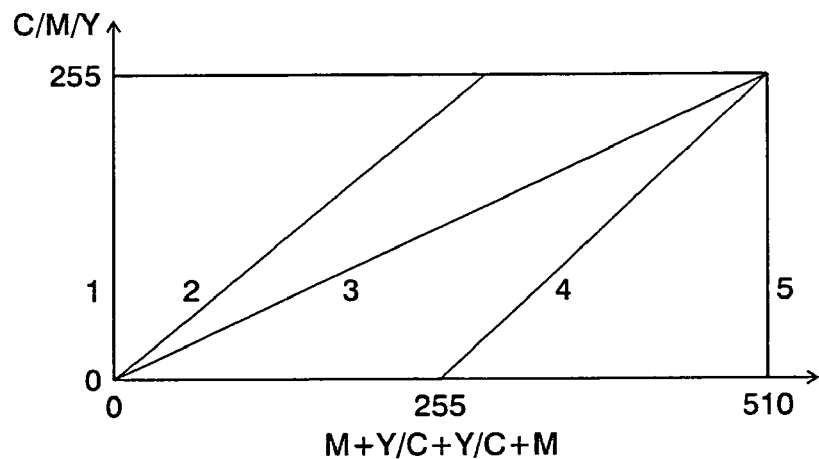
FIG. 3 comprises a two-dimensional LUT for CMY color channels.
Figure 4:
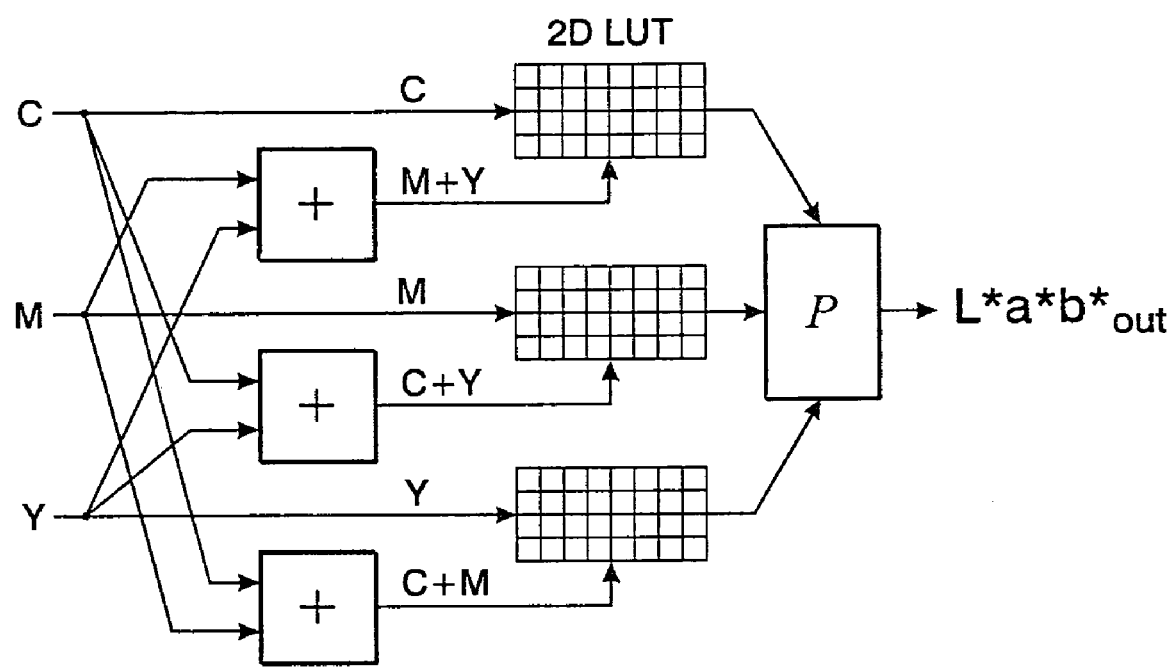
FIG. 4 is a functional block diagram illustrating adjustments of CMY values spatially based upon measured differences in values at selected spatial locations.

FIG. 3 shows the two-dimensional LUT for each channel and the five axes along which one-dimensional calibration is used to fill the LUT. In a simple implementation, axes 1, 2, 4 and 5 are calibrated using channel-wise calibration while axis 3 is calibrated using gray balanced calibration. The intermediate regions of the two-dimensional LUT are filled with any of the interpolation techniques (e.g., two-dimensional sequential linear interpolation). The corrected value for a CMY patch is obtained as shown in FIG. 4. Since the two-dimensional LUTs are pre-filled for all possible input combinations, the LUT processing involves only indexing and lookup operations. Although black separation uses simple channel linearization TRC, similar two-dimensional calibration LUTs can be incorporated with corresponding pair-wise CMY & K combinations.

Three-dimensional calibration technique provides the best results because it is nothing but the inverse printer mapping for every color in the node preceding the forward printer mapping. The inverse printer map is developed from the forward printer map using any of the well known techniques (e.g., herein incorporated by reference). In three-dimensional calibration, when the requested colors are specified in L*a*b*, the requested color to be printed can be obtained in the device-independent color space, i.e., L*a*b* color space and then passed through the inverse printer transformation to obtain the calibrated C'M'Y' values. These calibrated C'M'Y' values are then used with UCR (gray component replacement)/GCR (under color removal) map to create a L*a*b* to C'M'Y'K' map, called the profile LUTs. This represents the inverse mapping table required for typical four-color marking device.

In a typical image path, in the L*a*b* path, L*a*b* to C'M'Y'K' map is typically used and the gray balance TRCs and all or many of the required color rendering intents. There is also one-dimensional channel-wise linearization TRCs introduced after the gray balance TRCs.

One embodiment measures on paper the $L^*_{0,0} a^*_{0,0} b^*_{0,0}$ values using an in-line spectrophotometer, e.g., LCLED, and the two-dimensional reflectivity values using either a monochrome or a color scanner bar to correlate them. Another embodiment determines on paper the color values, form the measured reflectivity values using either monochrome or a color scanner bar on the P/R belt (e.g., iGen) or on the IBT (e.g., DC8000). These methodologies depend on the correlation between the measured difference ΔE (paper) and scanner reflectivity measurements on a belt if the belt scanner is used. Yet another embodiment measures on paper L*, a*, b* values for each pixel from the calibrated RGB scanner. The embodiment described below uses paper L*, a*, b* values.

Let $\delta L^*$, $\delta a^*$, $\delta b^*$, be the errors between the reference pixel coordinates [e.g., 0,0)] and pixel area (i, j). Then, $$\begin{bmatrix} \delta L^* \\ \delta a^* \\ \delta b^* \end{bmatrix}_{(i,j,c)} = \begin{bmatrix} L^* \\ a^* \\ b^* \end{bmatrix}_{(i,j,c)} + \begin{bmatrix} L^* \\ a^* \\ b^* \end{bmatrix}_{(0,0,c)} \quad (4)$$

where subscripts (i,j,c) represent the (i,j) coordinates of the pixel for the uniform color number represented by the letter 'c'. The uniform color is what is being printed as test page.

C'M'Y' values obtained for two-dimensional LUT (equations 1 to 3) or three-dimensional LUTs are morphed to each pixel area by the following linear equation $$\begin{bmatrix} C' \\ M' \\ Y' \end{bmatrix}_{(i,j,c)} = \begin{bmatrix} P_{11} & P_{12} & P_{13} \\ P_{21} & P_{22} & P_{23} \\ P_{31} & P_{32} & P_{33} \end{bmatrix}_{(c)} \begin{bmatrix} \delta L^* \\ \delta a^* \\ \delta b^* \end{bmatrix}_{(i,j,c)} + \begin{bmatrix} C' \\ M' \\ Y' \end{bmatrix}_{(0,0,c)} \quad (5)$$

where the coordinates (0, 0, c) represent the C'M'Y' values from the global LUTs obtained using in-line or off-line spectrophotometers. The mapping algorithm uses a 3×3 projection operator matrix with elements described by the matrix P. In this particular case, the projection matrix is calculated using the inverse of the sensitivity matrix, the Jacobian matrix, at each of the color values 'c' using printer models.

The maximum number of pixels along scan and process directions can be determined by the scanner resolution and any adequate hardware limitation.

Since the number of colors used during measurements (indicated by the letter 'c') is generally limited to a few (output of algorithm 5) when compared to the number of values (or nodes) in the two-dimensional or three-dimensional LUTs, interpolation algorithms are used to further populate the spatial maps to up-sample to the original size of the LUT.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A method for color calibration of a color output device, comprising:
    producing a first output image with the device in response to an input signal from a test image, wherein the first test image includes at least one preselected color;
    measuring with a first sensor the image corresponding to the preselected color, said first sensor producing a first output indicating color information for at least the preselected color;
    producing a multi-dimensional LUT of the device representative of the color information including the at least one preselected color;
    producing a second output image with the device, wherein the second output image includes the at least one preselected color located at a plurality of spatial locations in the second output image;
    measuring with a second sensor the image at the plurality of spatial locations corresponding to the preselected color of the second output image, said second sensor producing a second output indicating reflectance information for at least the preselected color at the plurality of spatial locations;
    determining an error between the measured color of the one preselected color at a preselected pixel location and the reflectance information at other pixel locations within the plurality of spatial locations corresponding to the preselected color;
    adjusting the multi-dimensional LUT to minimize the spatial uniformity errors at the other pixel locations, thus calibrating the device color output spatially whereby the device expeditiously produces a more uniform color over a calibrated output image.

2. The method of claim 1, wherein the preselected pixel location is an average of a block of pixels in a preselected spatial region of the preselected color.

3. The method of claim 2 wherein measuring with the first and second sensors occurs during real time operation of the device.

4. The method of claim 3, wherein the adjusting the LUT is accomplished for at least two of the plurality of spatial locations, and where said LUT includes control points for each of said spatial locations.

5. The method of claim 4 wherein the adjusting the LUT includes interpolating at least one uncontrolled point between the control point.

6. The method of claim 1, wherein the first color sensor is a spectrophotometer.

7. The method of claim 1, wherein the second sensor is located adjacent a photoconductive surface having a developed image thereon, and wherein the producing the second output indicating reflectance information is the result of sensing the reflectance of the photoconductive surface.

8. The method of claim 1 wherein the adjusting includes recursively determining the error until the error is less than a predefined value.

9. The method of claim 8 wherein the adjusting the LUT includes morphing C, M, Y values per each pixel location in the preselected spatial region by the following equation:

$$\begin{bmatrix} C' \\ M' \\ Y' \end{bmatrix}_{(i,j,c)} = \begin{bmatrix} P \end{bmatrix}_{(c)} \begin{bmatrix} \delta L^* \\ \delta a^* \\ \delta b^* \end{bmatrix}_{(i,j,c)} + \begin{bmatrix} C' \\ M' \\ Y' \end{bmatrix}_{(o,o,c)}$$

wherein δL, δa, δb, comprise the determined errors between the measured color (c) of the one preselected color at a pixel coordinate (0,0) and the measured color (c) within the preselected spatial region at a pixel coordinate (i, j).

10. The method of claim 9 wherein the projection matrix P comprises an inverse of a sensitivity matrix, the Jacobian matrix, at each color value (c) using a model of the color output device.

11. The method of claim 1 wherein adjusting the color calibration comprises three two-dimensional LUTs, one for each channel of a CMY measured patch comprising the one preselected color.

12. The method of claim 1 wherein the color calibration comprises adjusting a three-dimensional LUT including an inverse color output device mapping for every color in a node preceding a forward output device mapping.

13. The method of claim 1 wherein a common output image includes the first and second test images, and where measuring with the first and second sensors occurs sequentially using the common output image.

14. A color output system including a calibration system for dynamic color balance control of an output image, the system comprising:
a front end converter for converting an input signal representative of a target image comprising a preselected color into a device-dependent control signal in accordance with a device LUT;
a color marking engine, responsive to the device-dependent control signal, for generating a marked image in response thereto at a plurality of spatial locations;
a first sensor for measuring the marked image corresponding to the preselected color, said first sensor producing a first output indicating color information for at least the preselected color;
a second sensor for measuring the marked image at preselected spatial locations corresponding to the preselected color, said second sensor producing a second output indicating reflectance information for at least the preselected color; and
a controller for producing a multi-dimensional LUT using measurements from the at least one preselected color, producing an other output image with the device, wherein the other output image includes the at least one preselected color, and determining errors between the measured color of the image for the at least one preselected color at the preselected pixel location and at other pixel locations for constructing a plurality of spatially adjusted LUTs respectively corresponding to the other pixel locations to minimize spatial uniformity errors at all pixel locations, thus calibrating the device color output spatially;
whereby subsequently generated output images are output with the adjusted LUTs and, more accurately represent target input images.

15. The system of claim 14 wherein the controller further constructs the LUTs with uncontrolled points estimated from the measured preselected color at the other pixel spatial locations.

16. The system of claim 14 wherein the first and second sensors are disposed in-line for real time adjustment of the LUTs.

17. The system of claim 14 wherein the color calibration includes the two-dimensional LUTs, one for each channel of a CMY measured patch comprising the one preselected color.

18. The system of claim 14 wherein the color calibration includes the two-dimensional LUTs, one for each channel with a black (K) separation measured patch comprising the one preselected color.

19. The system of claim 14 wherein the color calibration comprises a three-dimensional LUT including an inverse output device mapping for every color in a node preceding a forward output device mapping.

20. A xerographic color output device, comprising:
a source of printable substrates, said source operatively connected to a printing engine, said printing engine producing an output image with the device in response to an input signal from a test image, wherein the test image includes at least one preselected color;
a spectrophotometer, said spectrophotometer measuring the image corresponding to the preselected color, said spectrophotometer producing a first output indicating color information for at least the preselected color;
a controller for producing a color LUT using measurements from at least one preselected color, and producing a second output image with the device in response to a request, wherein the second output image includes the at least one preselected color located at a plurality of spatial locations in the test image;
a reflectance scanner for sensing a developed color region of the second output image at a one of the preselected spatial locations corresponding to the preselected color, said reflectance scanner producing a second output indicating reflectance information for the preselected color at the one preselected spatial location;
said controller determining an error between the one preselected color and the measured color of the preselected color at the one preselected spatial location, using the color information and the reflectance information, and adjusting the LUT of the device at the developed color region to minimize spatial uniformity errors, thereby calibrating the device color output spatially.

* * * * *